United States Patent [19]

Jarvis et al.

[11] 4,193,973
[45] Mar. 18, 1980

[54] PROCESS FOR STABILIZATION OF DICALCIUM PHOSPHATE

[75] Inventors: William M. Jarvis, Webster Groves; Keun Y. Kim, Clayton, both of Mo.

[73] Assignee: Monsanto Company, St. Louis, Mo.

[21] Appl. No.: 972,566

[22] Filed: Dec. 22, 1978

[51] Int. Cl.$^2$ .............................................. C01B 25/32
[52] U.S. Cl. ..................................... 423/265; 423/274; 423/308
[58] Field of Search ................. 423/308, 309, 265, 274

[56] References Cited

U.S. PATENT DOCUMENTS

| | | | |
|---|---|---|---|
| 2,287,699 | 6/1942 | Moss et al. | 423/274 |
| 3,012,852 | 12/1961 | Nelson | 423/309 |
| 3,066,056 | 11/1962 | Schlaeger et al. | 423/308 |
| 3,411,873 | 11/1968 | Harnisch et al. | 423/308 |

Primary Examiner—O. R. Vertiz
Assistant Examiner—Wayne A. Langel
Attorney, Agent, or Firm—S. M. Tarter; E. P. Grattan; P. D. Matukaitis

[57] ABSTRACT

An improved process for the preparation of stabilized dicalcium phosphate dihydrate wherein an aqueous mixture containing dicalcium phosphate dihydrate is treated with a tetra-alkali metal pyrophosphate which comprises
 (a) adding a stabilizing amount of the tetra-alkali metal pyrophosphate to said aqueous mixture at a pH from about 5.5 to about 6.5 for said mixture; and then
 (b) adding to the mixture resulting from Step (a) a pharmaceutically acceptable material which increases the hydroxyl ion content in the mixture, in an amount which results in a stabilized dicalcium phosphate dihydrate having a pH from about 6.5 to about 8.0.

4 Claims, No Drawings

PROCESS FOR STABILIZATION OF DICALCIUM PHOSPHATE

BACKGROUND OF THE INVENTION

1. Field of the Invention

This invention relates to the stabilization of dicalcium phosphate dihydrate. More particularly, this invention relates to the stabilization of dicalcium phosphate dihydrate employing a tetra-alkali metal pyrophosphate.

2. Description of the Prior Art

Dicalcium phosphate dihydrate, i.e., $CaHPO_4.2H_2O$, is commonly used as a polishing agent in dentifrice compositions. In many cases the compositions also contain other ingredients which cause the dicalcium phosphate dihydrate present therein to dehydrate to the anhydrous form and/or to hydrolyze, yielding acidic products. The dehydration and/or hydrolysis causes undesirable conditions to occur in dentifrice compositions. One undesirable condition which has been attributed to such dehydration and/or hydrolysis is a change in composition consistency resulting in phase separation, thickening or, in extreme cases, solidification. Another problem which has occurred is tube corrosion which has resulted in tube blackening. In severe cases of corrosion, the tube is pitted and/or gas generated which exerts sufficient pressure to cause tube bulging.

It has therefore been customary to stabilize the dicalcium phosphate dihydrate employed in dentifrice compositions. Reference herein to stabilization of dicalcium phosphate dihydrate means that the tendency of the dicalcium phosphate dihydrate to dehydrate to the anhydrous form and/or to hydrolyze as previously described is reduced, thus making it more suitable for use in certain dentifrice compositions. Stabilization has usually been achieved by the addition of such materials as pyrophosphoric acid, sodium pyrophosphate or sodium-calcium pyrophosphate to a slurry of dicalcium phosphate dihydrate in water. The slurry has then been filtered and the calcium phosphate dihydrate is recovered for use in dentifrice compositions. Various other materials have been proposed for stabilization of dicalcium phosphate dihydrate, for example, it has been proposed to dry mix calcium phosphate with trimagnesium orthophosphate.

A process for preparing dicalcium phosphate dihydrate stabilized with a tetra-alkali metal pyrophosphate is disclosed in U.S. Pat. No. 2,287,699 issued to H. V. Moss et al on June 23, 1942. According to the procedure described therein, a dicalcium phosphate dihydrate is prepared by the addition of lime slurry to phosphoric acid under conditions such that the dicalcium phosphate dihydrated compound is precipitated. After precipitation is complete, an alkali metal pyrophosphate is added to the mother liquor containing the precipitate and the resulting slurry is heated to a temperature somewhat above the precipitation temperature and maintained at the elevated temperature for a short period of time during which the pH of the mother liquor is maintained above a pH of 7 by incremental additions of a tetra-alkali metal pyrophosphate. The stabilized dicalcium phosphate dihydrate is recovered by filtration, dried and ground.

In U.S. Pat. No. 3,012,852 issued to G. D. Nelson on Dec. 12, 1961, there is disclosed a process for preparing stabilized dicalcium phosphate dihydrate, which process involves the addition of a minor amount of pyrophosphate ions to phosphoric acid which is then employed in a reaction with a calcium source such as calcium hydroxide to form the dicalcium phosphate dihydrate.

Another process for stabilizing dicalcium phosphate dihydrate is described in U.S. Pat. Nos. 3,066,056 and 3,169,096 issued to Julian R. Schlaeger et al on Nov. 27, 1962 and Feb. 9, 1965, respectively. The process described therein employs pyrophosphoric acid and calcium-sodium pyrophosphate. In accordance with that process, pyrophosphoric acid is added to a reaction mixture resulting from the reaction of orthophosphoric acid with milk of lime and having a pH between about 5 and the neutralization point. The mixture is then neutralized with the addition of milk of lime, and the dicalcium phosphate dihydrate is removed, dried and admixed with finely divided calcium-sodium pyrophosphate to produce the stabilized dicalcium phosphate dihydrate product. It is stated therein that both the pyrophosphoric acid and calcium-sodium pyrophosphate additions are essential since neither alone produces a dicalcium phosphate dihydrate composition having desired stability.

In U.S. Pat. No. 3,411,873 issued to H. Harnisch et al on Nov. 19, 1968 there is described a process for stabilization of dicalcium phosphate dihydrate which employs a magnesium-ammonium phosphate as a stabilizer, preferably in combination with an alkali metal or alkaline earth metal pyrophosphate. It is stated therein that the stabilizers can readily be introduced into the reactor during the production of the dicalcium phosphate but before isolation thereof, at a pH value between 7.5 and 8.5.

Although the prior art processes are effective in the stabilization of dicalcium phosphate dihydrate, such processes have certain deficiencies. For example, substantial losses of pyrophosphate have been associated with processes for stabilization by the addition of tetra-alkali metal pyrophosphate to an aqueous mixture containing dicalcium phosphate dihydrate. Thus, to achieve a desired stabilizing level of pyrophosphate in the dicalcium phosphate dihydrate, it has been required to employ much higher levels of pyrophosphate in the form of the tetra-alkali metal pyrophosphate in such processes. Other processes, such as dry mixing dicalcium phosphate dihydrate with certain stabilizing materials, are not very effective in achieving a desired degree of stabilization. Thus, it can be seen that there is a need for an improved process for the stabilization of dicalcium phosphate dihydrate, which process results in an efficient utilization of the stabilizing agent.

It is therefore an object of the present invention to provide an improved process for the stabilization of dicalcium phosphate dihydrate employing a tetra-alkali metal pyrophosphate as a stabilizer. These and other objects will become apparent from the following detailed description.

SUMMARY OF THE INVENTION

In accordance with this invention, there is provided an improved method of preparing stabilized dicalcium phosphate dihydrate which comprises (a) adding a stabilizing amount of tetra-alkali metal pyrophosphate to an aqueous mixture containing dicalcium phosphate dihydrate and having a pH from about 5.5 to about 6.5; and then (b) adding a pharmaceutically acceptable material which increases the hydroxyl ion content in the mixture resulting from Step (a), in an amount which results in a stabilized dicalcium phosphate dihydrate having a pH from about 6.5 to about 8.0.

It has been surprisingly discovered that the process of this invention results in the retention in the final dicalcium phosphate dihydrate product of a very high percentage of the tetra-alkali metal pyrophosphate employed. High retention is desirable because the required amount of stabilizing material which must be employed to achieve a final dicalcium phosphate dihydrate product containing a particular level of stabilizer is minimized.

Thus, it can be seen that the present invention provides an improvement in the processes known in the art for the preparation of stabilized dicalcium phosphate dihydrate wherein an aqueous mixture containing dicalcium phosphate dihydrate is treated with a tetra-alkali metal pyrophosphate.

DETAILED DESCRIPTION OF THE INVENTION

In Step (a) of the process of this invention, tetra-alkali metal pyrophosphate is added to an aqueous mixture containing dicalcium phosphate dihydrate. Methods for obtaining such a mixture are well known to those skilled in the art, and typically involve the addition of lime slurry to phosphoric acid as described in the aforementioned U.S. Pat. No. 2,287,699. In accordance with the present invention, the pH of the aqueous mixture containing dicalcium phosphate must be from about 5.5 to about 6.5 just prior to the addition of the tetra-alkali metal pyrophosphate. This pH would typically be obtained by adjustment with lime slurry or phosphoric acid employed to prepare the mixture, although those skilled in the art will recognize that other materials may be employed for pH adjustment. Although the mechanism is not fully understood and it is not intended we be bound by any particular theory, it is believed that the pH of the aqueous mixture containing dicalcium phosphate dihydrate has a significant effect on the tetra-alkali metal pyrophosphate added thereto being retained in the final dicalcium phosphate dihydrate product. Inferior results, i.e., a less stable product, would be expected if the process of the present invention were carried out with the pH of the mixture much above 6.5 or much below 5.5. It is preferred in the present invention to add the tetra-alkali metal pyrophosphate at a pH from about 5.8 to about 6.5 for the aqueous mixture containing dicalcium phosphate dihydrate.

Tetra-alkali metal pyrophosphates which are employed in Step (a) are well known to those skilled in the art as being useful to stabilize dicalcium phosphate dihydrate, and such alkali metals would be known to be selected from the metals in Group Ia of the Periodic Table of the Elements. Preferred for use in the present invention are tetrasodium and tetrapotassium pyrophosphate, with tetrasodium pyrophosphate being most preferred.

The tetra-alkali metal pyrophosphate is added in Step (a) of the process of the present invention in a stabilizing amount, i.e., an amount sufficient to result in a stabilized dicalcium phosphate dihydrate. "Stabilized" dicalcium phosphate dihydrate would be well known to those skilled in the art to mean that the tendency of said dicalcium phosphate dihydrate to dehydrate to the anhydrous form and/or to hydrolyze, yielding acidic products, particularly in the presence of other ingredients upon storage is lower than that of dicalcium phosphate dihydrate which is not stabilized. Typically, the tetra-alkali metal pyrophosphate will be added in Step (a) in an amount corresponding to an addition of from about 0.25 to about 2.5 percent by weight of $P_2O_5$, as pyrophosphate, based on the weight of dicalcium phosphate dihydrate in the aqueous mixture. Preferably, the tetra-alkali metal pyrophosphate is added in an amount corresponding to an addition of from about 0.5 to about 1.5 percent by weight of $P_2O_5$, as pyrophosphate, on the just-stated basis. On yet another basis, the tetra-alkali metal pyrophosphate is added in an amount which results in a stabilized dicalcium phosphate dihydrate containing from about 0.2 to about 2.3 percent by weight of pyrophosphate $P_2O_5$, which would represent typical stabilized dicalcium phosphate dihydrate.

The temperature and pressure of the mixture after the addition of the tetra-alkali metal pyrophosphate are not extremely critical with ambient conditions being suitable, although temperatures from about 30° C. to about 60° C. are preferred. It is desirable to hold the mixture for a short period of time, for example, 5 to 60 minutes, and assure adequate contact of the ingredients in the mixture, for example by agitation.

To the resulting mixture is then added a pharmaceutically acceptable material which increases the hydroxyl ion content in said mixture. Those skilled in the art will recognize various materials which may be added to the mixture. Materials which are pharmaceutically acceptable and do not cause substantial interference with the desired reaction can be employed. The amount of said material can vary depending upon the pH desired for the stabilized dicalcium phosphate dihydrate final product. A preferred pH for the stabilized dicalcium phosphate dihydrate final product is from about 6.5 to about 8.0, and 6.8 to 7.8 is more preferred, the pH being determined by the procedure described in Example I herein. The amount of the material added in Step (b) would typically be adjusted to obtain the desired pH in the stabilized dicalcium phosphate. The amount of the material to be added to obtain a stabilized dicalcium phosphate is somewhat dependent upon the other ingredients present in the mixture resulting from Step (a). Measurements of pH and titration values on the mixtures employed in Steps (a) and (b) would typically be used to approximate the amount of material to be added to result in a stabilized dicalcium phosphate dihydrate product with a certain desired pH.

It is preferred to add in Step (b) pharmaceutically acceptable materials selected from alkali metal hydroxides, alkaline earth metal hydroxides and ammonium hydroxide. Typically such hydroxides would be added in an amount which corresponds to an addition of from about 0.02 percent to about 0.7 percent by weight of hydroxyl ions, based on the weight of dicalcium phosphate dihydrate present in the mixture. A particularly preferred material is calcium hydroxide. For purposes of this invention, lime is considered to be equivalent to calcium hydroxide, even though it may be in the form of calcium oxide.

It has been surprisingly discovered that the addition of the material to increase the hydroxyl ion content of the mixture in Step (b) is essential in the process of the present invention. It was found that a marked increase in the amount of tetra-alkali metal pyrophosphate retained by the dicalcium phosphate dihydrate occurred when the addition according to Step (b) was carried out. Therefore, the improved process of the present invention requires that both Steps (a) and (b) as previously defined be carried out sequentially.

After carrying out Steps (a) and (b) of the process of this invention, the dicalcium phosphate dihydrate stabilized with the tetra-alkali metal pyrophosphate can be recovered by conventional means well known to those skilled in the art. For example, steps such as decantation, centrifugation, filtration, precipitate washing, drying and milling are typically involved in obtaining the desired final product which is the dicalcium phosphate dihydrate containing a tetra-alkali metal pyrophosphate stabilizer.

The following Examples will illustrate the present invention in greater detail. Unless otherwise indicated herein, all parts, percentages, ratios and the like are by weight.

EXAMPLE I

An aqueous slurry containing dicalcium phosphate dihydrate (DCPD) was prepared by the reaction of phosphoric acid and lime in an aqueous media. The resulting slurry contained approximately 30 percent DCPD and the slurry pH was 5.8. This slurry was employed in various runs involving treatment with tetrasodium pyrophosphate.

In a first run, a 2770 gram sample of the aqueous slurry was charged to a one gallon reactor equipped with a stirrer. To this slurry was added 188 grams of a 9 percent tetrasodium pyrophosphate (TSPP) aqueous solution (a 2 percent addition of TSPP based on the DCPD present). The mixture was held at a temperature of about 29° C. with stirring for 45 minutes. Then, aqueous lime slurry (13.5 percent CaO) was added (herein referred to as the secondary lime addition) until the pH of the mixture measured about 7.9. The solid DCPD product was then separated from the slurry, dried and milled.

In a second run, a 2780 gram sample of the original DCPD aqueous slurry with pH adjusted to 6.5 using lime slurry (13.5 percent CaO) was charged to a one gallon reactor equipped with stirrer. As in the first run, there was added to this slurry 188 grams of a 9 percent TSPP aqueous solution (2 percent TSPP based on the DCPD present) and the mixture was stirred for 45 minutes at about 29° C. The pH was then adjusted to about 7.7 with aqueous lime slurry (13.5 percent CaO) and the solid DCPD product was recovered as in the previous run.

In a third run, a 2640 gram sample of the original DCPD aqueous slurry with pH adjusted to 7.0 using lime slurry (13.5 percent CaO) was employed. The TSPP treatment was carried out as in the previous runs, with 179 grams of a 9 percent TSPP solution (2 percent TSPP based on the DCPD present) being employed. In this third run there was no lime addition after the 45 minute treatment and the product was recovered as in the previous runs.

A fourth run employed 1430 grams of the original DCPD aqueous slurry with a starting pH at about 6.0. The TSPP treatment was carried out as in the previous runs except that a temperature of about 40° C. was maintained from just prior to the TSPP addition through the 45 minute treatment period. As in the previous runs, the TSPP was added at 2 percent based on the DCPD present. After the 45 minute period, the pH was adjusted to 7.4 using aqueous lime slurry (13.5 percent CaO) and the solid DCPD product was recovered as in the previous runs.

For each of the above 4 runs, the pyrophosphate content of the DCPD was measured after the 45 minute stirring period just prior to the secondary lime addition and again after completion of all steps. For these measurements, the solid DCPD from a small portion of the sample was separated, dried and ground and the $P_2O_5$ levels corresponding to the pyrophosphate present were determined substantially in accordance with the well known ion exchange method for analysis of sodium triphosphate (ASTM D-2671-70 [reapproved 1975], entitled Standard Method for Analysis of Sodium Triphosphate by the Simplified Ion Exchange Method).

Also, a test for stability was run on the DCPD after the 45 minute stirring period but before any secondary lime addition for the first, second and fourth runs, and on the DCPD final product for each run. For the stability test some DCPD from a portion of the slurry was separated, dried and ground and was mixed with a solution which was 80 percent glycerine and 20 percent water (25 grams DCPD to 20 milliliters of the solution). The resulting paste was placed in a 1-inch by 6-inch (2.54 × 15.24 centimeters) Pyrex test tube to a depth of about 3.8 centimeters. The test tube was then suspended vertically in a beaker containing boiling water for 30 minutes, the water level being maintained above the paste level in the tube. The sample was then removed from the bath and air cooled to room temperature. The paste was then diluted with about 50 milliliters of 3A alcohol and filtered. This alcohol wash was repeated three more times and then after a similar wash with acetone the solid was air dried until no odor of acetone could be detected. A weight loss on ignition (LOI) of the dry solid was then determined by placing a sample of the solid material in an oven at 800° C. for 30 minutes and the final result is reported as $$\% \, LOI = \frac{\text{WEIGHT OF THE SAMPLE LOST}}{\text{WEIGHT OF SAMPLE}} \times 100\%$$

In ths stability test, a higher percent LOI corresponds to a more stable DCPD.

In each of the above 4 runs, a pH of the final DCPD product was determined by separating, drying and grinding some DCPD from a portion of the sample and preparing an aqueous slurry (50 grams DCPD to 100 milliliters water) and measuring the pH of said slurry. A pH of from about 6.8 to about 7.5 is preferred for DCPD employed in dentrifrice compositions.

The results of the four runs are reported in Table 1. The results show that the pyrophosphate content for the DCPD final product was substantially lower for Run 3 in which the initial slurry pH was 7.0 and there was no lime addition following the TSPP treatment. The results also show that a large increase in pyrophosphate content in the DCPD occurred when the secondary lime was added in Runs 1 and 4. The stability test results indicate that the DCPD stability was improved after the secondary lime addition in Runs 1, 2 and 4 and also that the DCPD prepared in these runs was superior in stability to that prepared in Run 3.

TABLE 1

| | Run 1 | Run 2 | Run 3 | Run 4 |
|---|---|---|---|---|
| Initial Slurry pH | 5.8 | 6.5 | 7.0 | 6.0 |
| % $P_2O_5$ (as pyrophosphate) in DCPD | | | | |
| .. Immediately prior to secondary lime addition | 0.40 | 0.51 | 0.40 | 0.35 |
| .. Final product (after secondary | | | | |

TABLE 1-continued

|  | Run 1 | Run 2 | Run 3 | Run 4 |
|---|---|---|---|---|
| lime addition) | 0.78 | 0.55 | 0.40* | 0.78 |
| Stability Test on DCPD (% LOI) .. Immediately prior to lime addition | 8.9% | 9.1% | 9.0% | 9.1% |
| .. Final product (after lime addition) | 17.8% | 11.2% | 9.0% | 15.3% |
| Final DCPD pH | 7.3 | 7.0 | 7.0 | 7.4 |

*No secondary addition in this run.

EXAMPLE II

In a large scale demonstration, batches of an aqueous slurry containing dicalcium phosphate dihydrate were prepared by the reaction of phosphoric acid and lime in an aqueous media. The resulting batch slurries contained approximately 20–30 percent DCPD. The batches were adjusted to a certain pH, which was not the same for each batch. The batches were then treated with TSPP by the addition thereto of a certain amount of TSPP and holding for 30–60 minutes while agitating. Following a 30–60 minute hold period, a lime slurry addition was made to some of the batches, the amounts of which corresponded to from about 0.025 to about 0.5 percent hydroxyl ions, based on the DCPD present in the batch. The DCPD stabilized with TSPP was then recovered from each batch by separation methods and was then dried and milled. For each of the batch runs a pyrophosphate content determination and stability test were run by the procedures described in Example I. The pH of the final DCPD product was in each case between about 7.0 and 7.9, also determined by the procedure described in Example I.

Results of the various runs are reported in Table 2.

TABLE 2

| | Slurry pH | | | DCPD Product | |
|---|---|---|---|---|---|
| Batch | Before TSPP Addition | % TSPP Added | Secondary Lime | Stability Test (% LOI) | % P$_2$O$_5$ (as pyrophosphate) |
| A | 6.9–7.0 | 1.8 | No | 9.6* | 0.39* |
| B | 6.9–7.0 | 2.2 | No | 13.7* | 0.48* |
| C | 6.7 | 2.2 | Yes | 10.9 | 0.33 |
| D | 6.4 | 2.2 | Yes | 16.7 | 0.61 |
| E | 6.3 | 2.2 | Yes | 17.4 | 0.75 |
| F | 6.5 | 2.2 | Yes | 16.8 | 0.90 |
| G | 6.4 | 2.2 | Yes | 17.3 | 1.20 |
| H | 6.4 | 2.2 | Yes | 16.9 | 1.02 |
| I | 5.9 | 2.2 | Yes | 16.0 | 0.75 |
| J | 6.1 | 2.2 | yes | 17.6 | 0.92 |
| K | 6.1 | 2.2 | Yes | 15.8 | 0.78 |
| L | 5.9 | 2.2 | Yes | 17.2 | 0.83 |
| M | 6.0 | 2.2 | Yes | 18.0 | 0.95 |

*average results of multiple runs

The data in the above Examples I and II clearly demonstrate the advantageous results that are obtained by the process of the present invention.

What is claimed is:

1. In a process for the preparation of stabilized dicalcium phosphate dihydrate wherein an aqueous mixture containing dicalcium phosphate dihydrate is treated with a tetra-alkali metal pyrophosphate, the improvement which comprises
   (a) adding a stabilizing amount of the tetra-alkali metal pyrophosphate to said aqueous mixture at a pH from about 5.5 to about 6.5 for said mixture; and then
   (b) adding to the mixture resulting from Step (a) a material selected from the group consisting of alkali metal, alkaline earth metal and ammonium hydroxides in an amount which results in a stabilized dicalcium phosphate dihydrate having a pH from about 6.5 to about 8.0.

2. A process in accordance with claim 1 wherein the tetra-alkali metal pyrophosphate is tetra-sodium pyrophosphate.

3. A process in accordance with claim 1 or 2 wherein the material added in Step (b) is calcium hydroxide.

4. In a process for the preparation of stabilized dicalcium phosphate dihydrate wherein an aqueous mixture containing dicalcium phosphate dihydrate is treated with a tetra-alkali metal pyrophosphate, the improvement which comprises
   (a) adding to said mixture, having a pH from about 5.8 to about 6.5, tetrasodium pyrophosphate in an amount corresponding to from about 0.5 to about 1.5 percent by weight of P$_2$O$_5$, as pyrophosphate, based on the weight of dicalcium phosphate dihydrate in said mixture; and then
   (b) adding calcium hydroxide to the mixture resulting from Step (a) in an amount which results in a stabilized dicalcium phosphate dihydrate having a pH from about 6.8 to about 7.8.

* * * * *